United States Patent [19]
Fujii et al.

[11] Patent Number: 4,555,021
[45] Date of Patent: Nov. 26, 1985

[54] CASING FOR MAGNETIC TAPE CASSETTE

[75] Inventors: Tatsuo Fujii; Shigetomo Takeda, both of Tokyo, Japan

[73] Assignee: TDK Corporation, Tokyo, Japan

[21] Appl. No.: 606,187

[22] Filed: May 2, 1984

[30] Foreign Application Priority Data

Jun. 1, 1983 [JP] Japan ............................ 58-81837[U]

[51] Int. Cl.$^4$ ...................... B65D 55/02; B65D 85/67
[52] U.S. Cl. .................................. 206/387; 206/45.34
[58] Field of Search ................. 206/387, 45.31, 45.33, 206/45.34

[56] References Cited

U.S. PATENT DOCUMENTS

| | | | |
|---|---|---|---|
| 3,604,556 | 9/1971 | Schwartz | 206/387 |
| 3,847,276 | 11/1974 | Lehner et al. | 206/45.34 |
| 4,438,846 | 3/1984 | Styuanow | 206/45.34 |
| 4,501,359 | 2/1985 | Yoshizawa | 206/387 |

FOREIGN PATENT DOCUMENTS 85892  8/1975  Australia ............................ 206/387

*Primary Examiner*—Joseph Man-Fu Moy
*Attorney, Agent, or Firm*—Oblon, Fisher, Spivak, McClelland & Maier

[57] ABSTRACT

A casing for holding a magnetic tape cassette which is formed into a box shape by bending and joining a blank of a transparent blastic plate material which has one surface, constituting the inner surface of a casing, on which grooves and a minutely roughened area are provided except for on a predetermined portion including at least one transparent window and the other surface, constituting the outer surface of said casing, on which printing and/or an uneven surface pattern is provided in a predetermined portion except for said transparent window.

4 Claims, 9 Drawing Figures

FIGURE 3
FIGURE 7
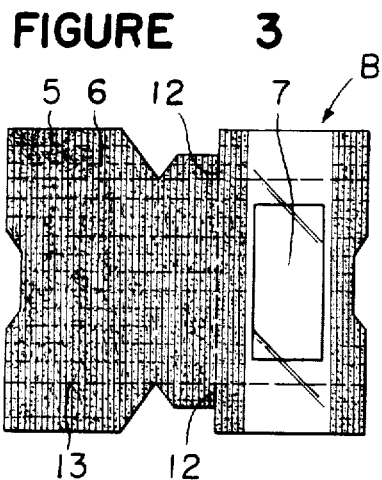
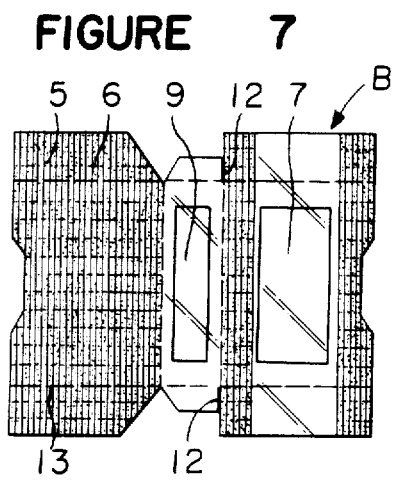
FIGURE 4
FIGURE 8
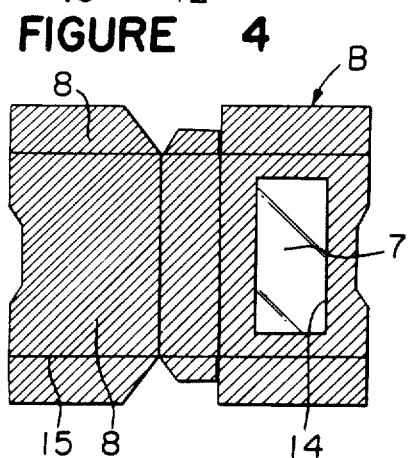
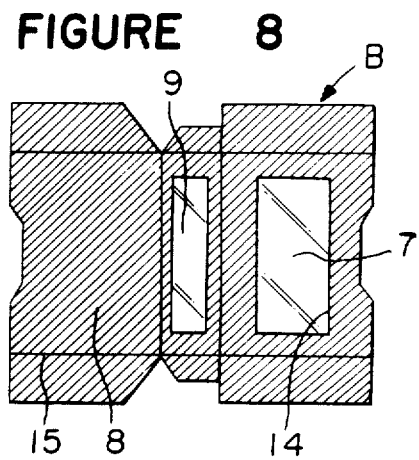
FIGURE 5
FIGURE 9
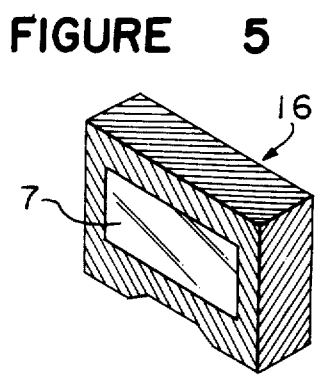
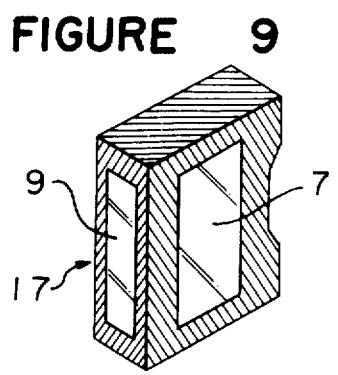

CASING FOR MAGNETIC TAPE CASSETTE

The present invention relates to a casing for a magnetic tape cassette for holding a cassette such as a videotape cassette.

A VHS system or a beta system videotape cassette is normally held in a casing made of a material such as cardboard or plastic resin to prevent dust from entering in it, to eliminate flaws caused by physical contact and to facilitate to putting in and out the tape cassette. The present invention particularly concerns a casing made of plastic resin. On the outer surface of casing, a trademark and design are usually provided; however, there is nothing on the inner surface. Since the outer surface side of the videotape cassette is formed by a hard plastic material, slippage of the cassette is too much when it is put into the plastic casing and the cassette tends to drop out the casing. Further, since the casing has an opening through which a tape cassette is inserted and the inner portion of the casing is visible to considerable extent, it is not satisfactory from the viewpoint of design. In addition, when a window is to be formed in the plastic casing to allow observation of the tape cassette held in the casing, it is necessary to stamp a plate material (a blank) into the form of a window and to bond a transparent plastic sheet at the circumferential part of the window.

It is an object of the present invention to eliminate drawbacks of the conventional casing and to provide a plastic casing for holding a magnetic tape cassette which holds therein a magnetic tape cassette by a proper frictional force and is excellent in design.

It is another object of the present invention to provide such a casing simplifying its manufacturing process.

The foregoing and the other object of the present invention have been attained by providing a casing for holding a magnetic tape cassette which is formed into a box shape by bending and joining a blank of a transparent plastic plate material which has one surface, constituting the inner surface of a casing, on which grooves and a minutely roughened area are provided except for on a predetermined portion including at least one transparent window and the other surface, constituting the outer surface of said casing, on which printing and/or an uneven surface pattern is provided in a predetermined portion except for said transparent window.

A more complete appreciation of the invention and many attendant advantages thereof will the readily obtained as the same becomes better understood by reference to the following detailed description when considered in connection with the accompanying drawings, wherein:

FIG. 3 is a rear view of a blank stamped out;

FIG. 4 is a front view of the blank as shown in FIG. 3;

FIG. 5 is a perspective view of a plastic casing of the first embodiment of the present invention;

FIG. 7 is a rear view of a blank according to the second embodiment of the present invention;

FIG. 8 is a front view of the blank as shown in FIG. 7; and

FIG. 9 is a perspctive view of a casing according to the second embodiment of the present invention.

Preferred embodiments of the present invention will be described in detail.

A casing for holding magnetic tape cassette of the present invention is fabricated by a single transparent blank made of plastic resin. In the inner surface of the plastic casing, a grooved lattice pattern and minutely roughened surface are formed except for an area in which a window is to be formed and which remains transparent. On the other hand, on the outer surface of the casing, a lattice pattern, a window frame, decoration, design and so forth are formed by printing and embossing.

Thus, the plastic casing of the present invention can be fabricated by a single flat plate and its manufacturing processes can be remarkably simplified. Transparent windows enable users to ascertain the volume of the magnetic tape remaining non-used and description concerning recorded sound or recorded image. Further, the frame of the transparent windows can be accented by embossing or depressing operations to increase visual effect of the windows. The grooved lattice pattern and/or the minutely roughened surface is formed in the inner surface whereby proper friction is imparted to prevent the magnetic tape cassette from its droppage and flaws caused by physical contact between the inner surface of the casing and the tape cassette.

The first embodiment of the plastic casing of the present invention will be described with reference to FIGS. 1 to 5 which show manufacturing processes of the plastic casing and the structure thereof.

First of all, a flat plastic plate P is prepared. The plastic plate is of a transparent or a semitransparent plate made of a cardboard-like, strong and flexible thermoplastic resin material such as polyester, polypropylene, polycarbonate, polyvinyl chloride and so on.

Figure 1:
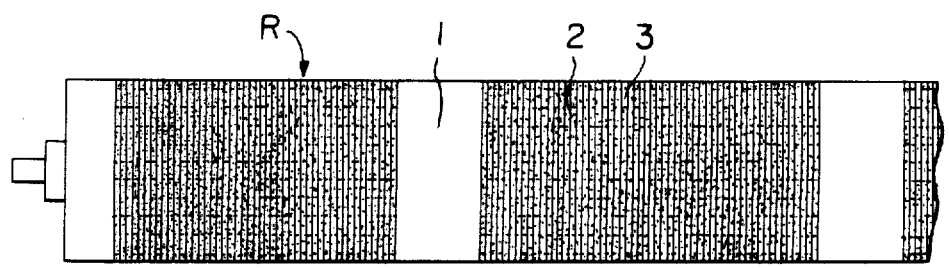
FIG. 1 is a front view of an embodiment of the roller for press-forming a blank for a plastic casing according to the first embodiment of the present invention.
Figure 2:
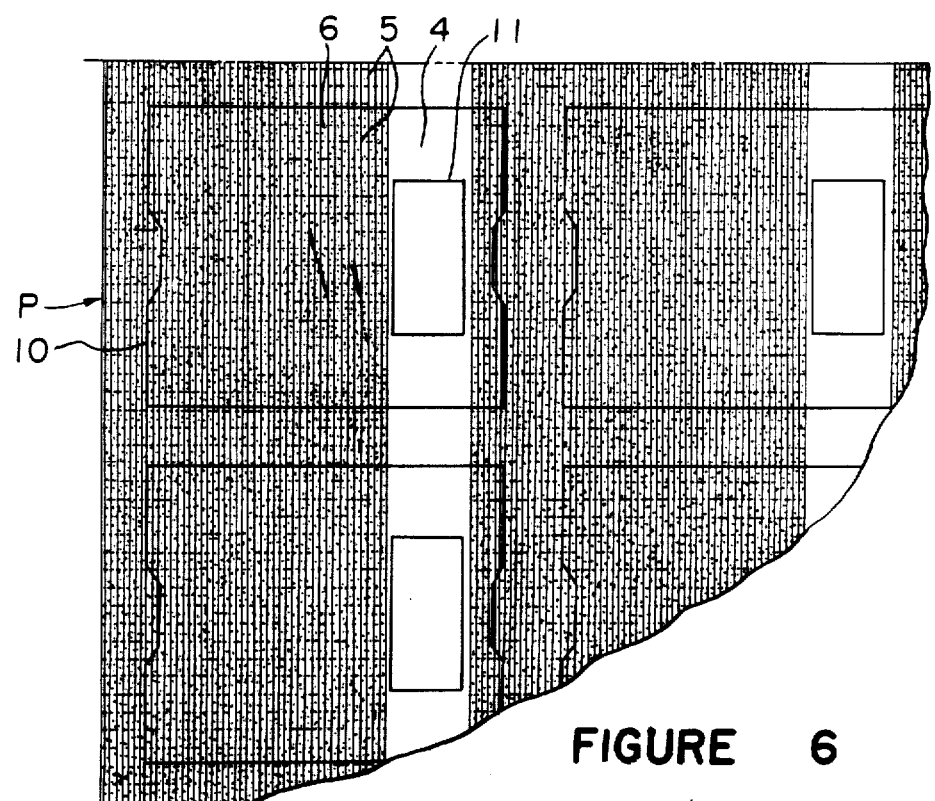
FIG. 2 is a plan view showing a flat plate made of plastic resin for the manufacture of a casing according to the first embodiment of the present invention and a pattern formed on the flat plate by pressing operation.

On the other hand, a metallic press-forming roller R, as shown in FIG. 1, heated by means of steam or an electric heater is prepared. The roller R is provided with a mirror surface part 1 at a portion corresponding to a transparent part of a plastic blank, a lattice-shape projecting part 2 at a position corresponding to the grooved lattice pattern of the blank, and a minutely roughened surface part 3 at a position corresponding to the areas of the grooved lattice pattern to be formed in the plastic blank. One or more number of sets of these parts are repeatedly formed on the roller R along the axix of the roller to allow the processing of one or more number of blanks simultaneously. Namely, as shown in FIG. 2, a transparent plastic plate having a large surface area is continuously passed between the roller R heated at a high temperature and a separate roller having a mirror surface (not shown) to transfer surface patterns formed on the roller R into the surface of the transparent plastic plate P. That is, a transparent part 4 in the plastic plate corresponds to the mirror surface part 1; a grooved lattice pattern 5 corresponds to the lattice-shape projecting part 2 and a minutely roughened surface part 6 corresponds to the part 3 of the roller R respectively. The surface of the blank having been subjected to press-forming process constitutes the inner surface of the casing.

Figure 6:
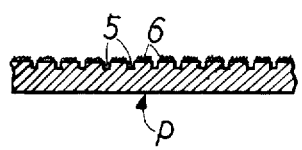
FIG. 6 is an enlarged cross-sectional view of the blank.

As shown in FIG. 6 indicating an example of the grooved lattice pattern in an enlarged cross-sectional view, it consists of groove 5 in a guadrilateral form and minitely roughened surface parts 6 formed between the grooves 5 and is generally in semi-transparent. The grooves 5 and the roughened surface parts can be formed by another way and pattern.

In FIG. 2, the line indicated by the reference numeral 10 represents the outline of a blank to be stamped out and the line indicated by the numeral 11 represents the outline of a window. A transparent plastic plate P having been subjected to press-forming operations is stamped out using a suitable stamping mold along the outline 10, with the result that a blank B is obtainable as shown in FIGS. 3 and 4. FIG. 3 shows the reverse surface and FIG. 4 shows the front surface of the blank respectively. Then, slits 12 are formed in the blank B and a heat pressing opertion is applied to the blank B to form a groove 15 along the dotted line 13 so that the blank is easily bent inwardly. At the same time, the heat pressing operation is applied to the blank along the line 11, which corresponds to the outline of a transparent window 7, to form a window frame 14. Printing may be applied to a predetermined surface area of the front surface to form decoration surface before or after the heat pressing operation. For example, printing is made for a lattice pattern, colored strips, a trademark, indication marks (which are shown by hatched lines for the purpose of simplification). Alternatively, a heat roller (not shown) having a lattice-shape emboss pattern may be used for press-forming instead of a certain step of the printing processes. Further, it may be that a part being subject neither to printing nor press-forming is left at a predetermined portion.

Finally, the blank B is bent along the groove 15 into a box form and overlapping parts are bonded to obtain a completed casing 16.

FIGS. 7 and 8 show a separate embodiment of the casing according to the present invention and FIG. 9 shows a completed casing 17. The casing of the embodiment is substantially the same as the casing of the first embodiment provided that an additional window 9 is formed in a shoulder portion of the casing. It is needless to say that a press-forming roller should be modified accordingly.

As described above, the casing of the present invention is fabricated by a single transparent plastic blank to thereby simplify manufacturing processes. Further, since a grooved lattice pattern and/or a minutely roughened surface is formed in the inner surface side of the blank, a proper frictional force is imparted to the magnetic tape cassette and occurrence of flaws is prevented due to unevenness of the inner surface of the casing. On the other hand, the outer surface side on which decoration is provided imparts beautiful appearence because the transparent windows 7, 8 are accented by forming the window frame. Further, provision of the lattice pattern and the minutely roughened surface increases itself the value of a product. It is noted that it is sufficient to form either one of the lattice pattern and the minutely roughened surface in the inner surface side as long as frictional property for the magnetic tape cassette is satisfactorily given.

We claim:

1. A casing for holding a magnetic tape cassette which is formed into a box shape by bending and joining a blank of a transparent plastic plate material which has one surface, constituting the inner surface of a casing, on which grooves and a minutely roughened area are provided except for on a predetermined portion including at least one transparent window and the other surface, constituting the outer surface of said casing, on which printing and/or an uneven surface pattern is provided in a predetermined portion except for said transparent window.

2. The casing for holding a magnetic tape cassette according to claim 1, wherein a window frame of said transparent window is formed by pressing to have an uneven pattern.

3. The casing for holding a magnetic tape cassette according to claim 1, wherein the outer surface of a window frame of said transparent window is printed to form a decorated surface.

4. The casing for holding a magnetic tape cassette according to claim 1, wherein said minutely roughened area is formed in said grooved lattice pattern.

* * * * *